United States Patent [19]

Holland et al.

[11] 4,391,223
[45] Jul. 5, 1983

[54] CARDBOARD HOUSE FOR PETS

[76] Inventors: Gwendolyn B. Holland; John W. Holland, both of 97 Gay Bower Rd., Monroe, Conn. 06468

[21] Appl. No.: 400,345

[22] Filed: Jul. 21, 1982

[51] Int. Cl.³ .............................................. A01K 1/00
[52] U.S. Cl. .................................... 119/19; 229/16 A
[58] Field of Search .............................. 119/15, 16, 19; 229/16 A, 32, 35

[56] References Cited

U.S. PATENT DOCUMENTS

| | | | |
|---|---|---|---|
| 1,313,691 | 8/1919 | Hixson | 119/19 |
| 2,522,598 | 9/1950 | Blandford | 229/35 |
| 2,901,158 | 8/1959 | Carpino | 229/35 |
| 3,552,356 | 1/1971 | Rosenthal | 119/1 |

*Primary Examiner*—Robert P. Swiatek
*Attorney, Agent, or Firm*—H. Gibner Lehmann; K. Gibner Lehmann

[57] ABSTRACT

A one-piece cardboard house for an animal or pet, comprising a bottom panel constituting the floor, front and rear panels, and two side panels, each of the latter four panels being integral with the bottom panel, and forming the four walls of the house. A pair of roof panels forms a peaked roof, and the panels are also integral with one another and with one of the side walls of the house. The free edge of that roof panel which is opposite the integral side wall is joined to the other side wall by a unique releasable fastener arrangement. The front panel has a large notch at its top edge portion which partially defines an entrance passage to the house, with other parts of the entrance passage being defined by the edge portions of the two roof panels. The arrangement is such that the house can be stored or shipped in a flat or collapsed condition, and thereafter readily assembled by the consumer. Since no adhesives or glues are involved in the assembly, there is none of the bother, inconvenience or mess that is normally associated with use of such substances.

10 Claims, 8 Drawing Figures

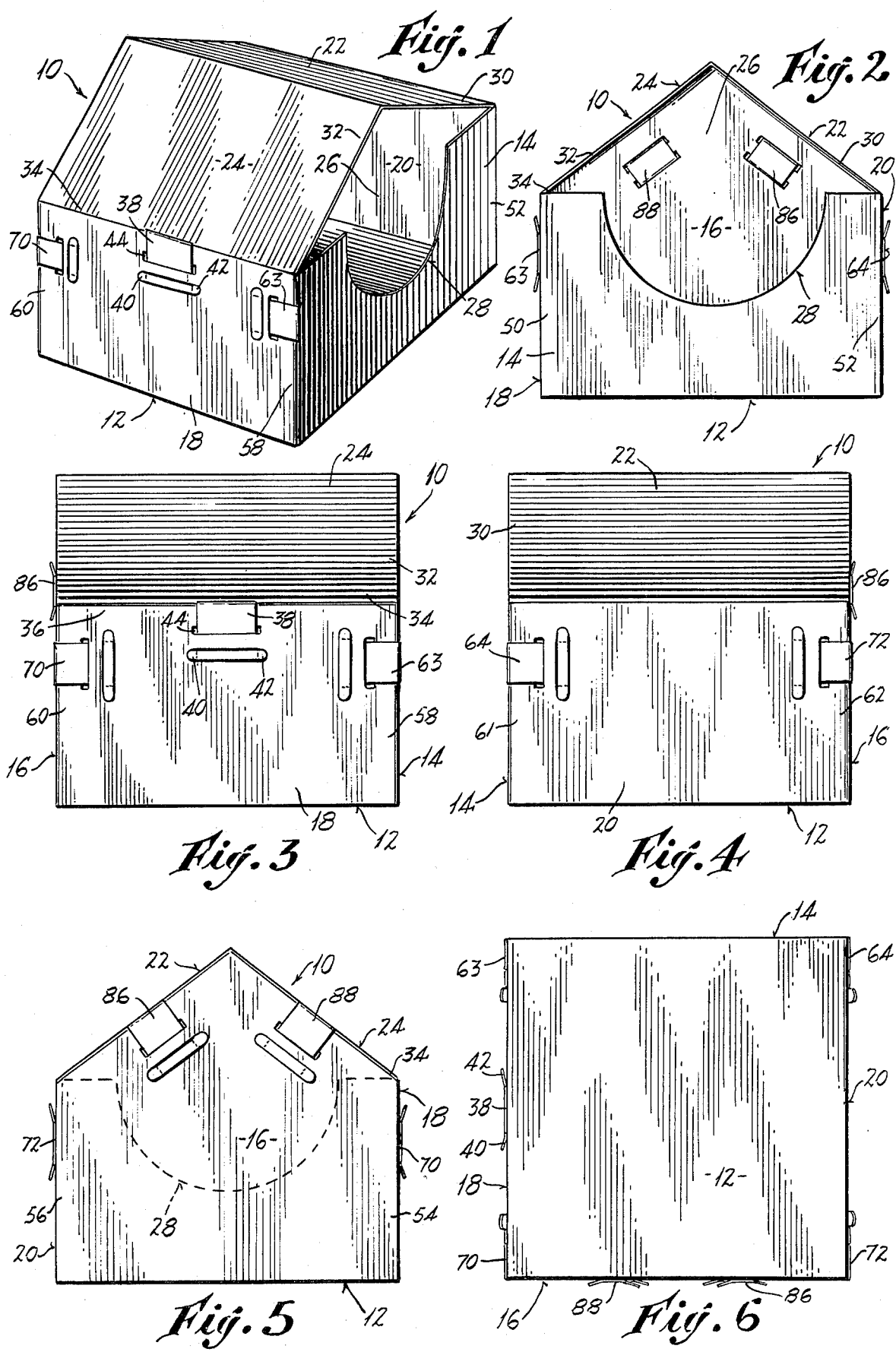

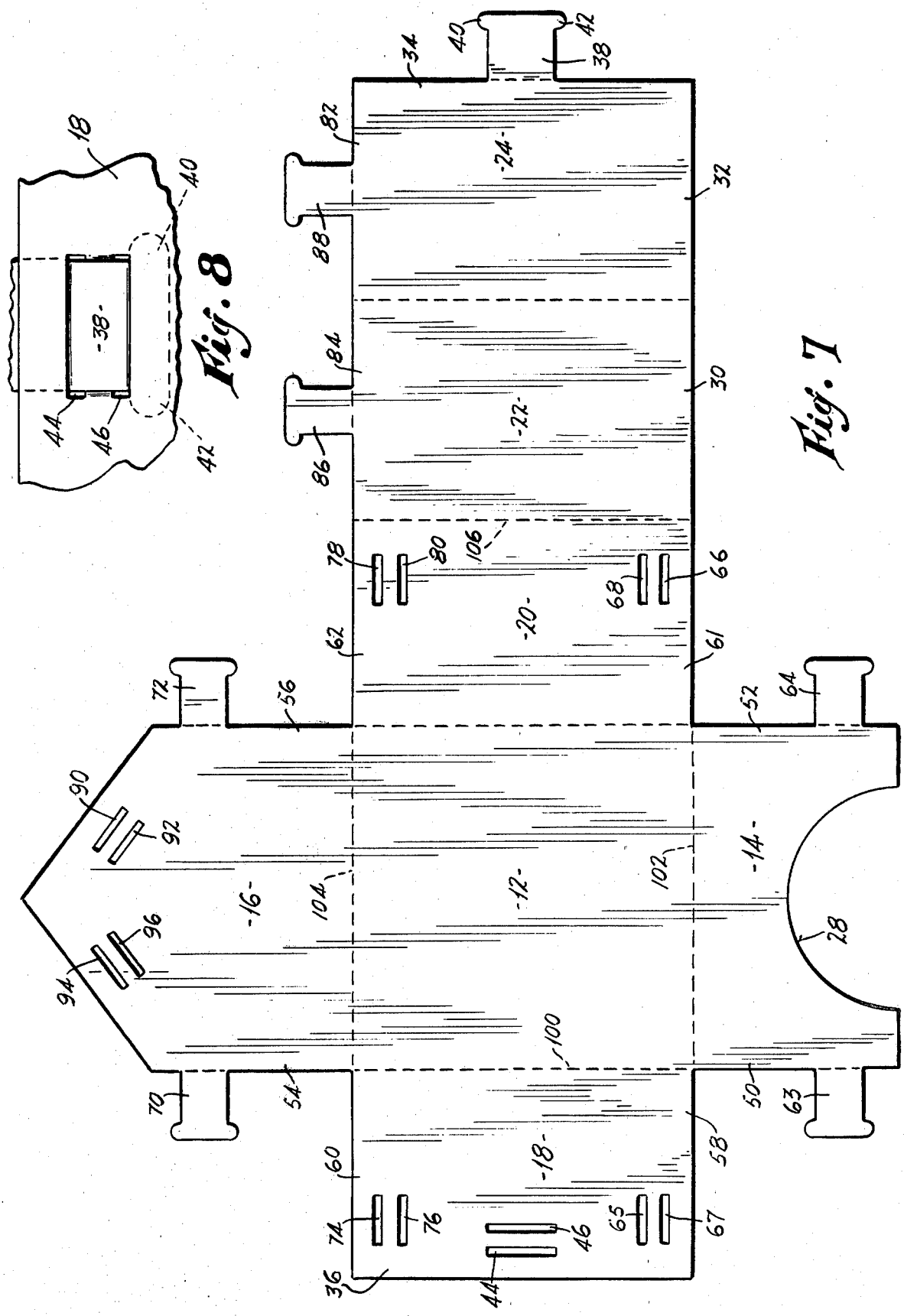

CARDBOARD HOUSE FOR PETS

BACKGROUND

This invention relates generally to pet houses, and more particularly to houses that are fabricated from cardboard and are intended to be used indoors, as for example in a garage, residence or dwelling.

In the past, a number of cardboard houses for pets have been proposed and produced, and have met with varying degrees of success or acceptance.

U.S. Pat. Nos. 3,016,042; 3,581,708; and 4,295,446 all show various arrangements for cardboard pet house structures. In U.S. Pat. No. 3,016,042, there is illustrated a cardboard house which is fabricated from a single sheet of material that has multiple fold lines, whereby the sheet can be folded to the setup configuration shown in order to produce the completed article. The house is open at the top, and has an entrance at one end. The panels of the structure are arranged to overlap, and are secured by either adhesive tape or other suitable fastening means such as prong-type fasteners.

U.S. Pat. No. 4,295,446 shows, in one embodiment, a two-piece unit, one piece being constituted as a floor with integral front and rear fold-up walls, and the other as a roof section having depending side walls. The various sections are fastened together in the desired manner by means of either taped joints or what is known as "button and string" tie fasteners. A modification comprising a one-piece construction is also illustrated and described.

U.S. Pat. No. 3,581,708 shows yet another type of pet house, involving a roof section that is separate from the side walls and floor of the house, and wherein the roof section is glued in position to form the finished unit. This construction has the capability of being stored or shipped in a flat or collapsed condition, with means for securing or locking the panels in such condition.

While many of the prior pet houses of the type adapted for indoor use functioned in an acceptable manner, several disadvantages became apparent. The use of adhesives or glue for securing the various panels together represented a nuisance to the consumer, since they tended to be messy, and susceptible to spillage, etc. Also, where glues are employed, there is a pronounced tendency for them to run down the sides of the panels, necessitating their care in application and frequent wiping off of any excess. Where glue came in contact with any of the panels of the house, it tended to obliterate decorations or decorative designs or markings that might have been printed thereon or otherwise applied thereto.

Also, once the house is assembled for the first time, it is difficult to separate the parts of the unit later on, as required during storage or shipping. Any attempt to pull apart the glued pieces usually results in separation of one of the outer layers of the cardboard, leaving a rough, unfinished appearance and giving rise to undesired curling of the resultant panel. In addition to suffering reduced strength, the smooth finish of the cardboard can be damaged, causing a rather unsightly condition which detracts from the overall appeal of the unit.

Several of the prior devices involved button-and-string type fasteners, which had the disadvantage of being unsightly and detracting from the appearance. With the use of prong type fasteners, there was the danger of injury to small children from either puncture type wounds, or scratches. In addition, the use of small fasteners represented an unnecessary hazard, since small children tended to put such articles in their mouths or swallow them. This inherent danger with small removable fasteners is reason enough to try to avoid their use altogether.

Also, where glues are being applied, it is necessary to physically hold the parts together until the glue becomes sufficiently tacky. This too represents a nuisance and inconvenience to the consumer.

Several of the prior art devices were not sufficiently open to enable the owner to readily view the pet during such times that the animal occupied the house. This was especially true of the units shown in U.S. Pat. Nos. 4,295,446 and 3,581,708. To a somewhat lesser degree, it is also true of the device of U.S. Pat. No. 3,016,042.

SUMMARY

The above disadvantages and drawbacks of prior cardboard houses for pets are largely obviated by the present invention, which has for one object the provision of a novel and improved one-piece cardboard pet house which is simple in construction and inexpensive to manufacture, thus making the device especially well adapted for commercial sale, and for use by the consumer in the home.

A related object of the invention is to provide an improved cardboard house for pets as above set forth, which can be stored or shipped in an essentially perfectly flat condition and thereafter readily assembled by the pet owner in a relatively short time period, without the use of special fixtures, tools, etc.

Still another object of the invention is to provide an improved pet house as above characterized, which does not require the use of special adhesives, glues, or tapes in the assembly, thus greatly simplifying the procedure and virtually eliminating the inconvenience or mess often associated with such adhesive substances.

Yet another object of the invention is to provide an improved pet house of the kind indicated, which can be readily disassembled, if desired, without there occuring damage to the house, thus making the unit especially well suited for storage when not in use.

A still further object of the invention is to provide an improved cardboard house for pets as outlined above, which eliminates the need for metal fasteners or clips, thus posing no safety hazard to small children playing in the vicinity of the house.

Yet another object of the invention is to provide an improved pet house as indicated above, wherein the access or entrance opening is sufficiently large and is disposed at a location in the house wherein the pet owner can readily view the pet and vice-versa, thus adding a degree of enjoyment to the use of the house, and enhancing the feeling of companionship beteen the pet and its owner.

Still another object of the invention is to provide an improved cardboard house for pets according to the foregoing, wherein the arrangement for fastening the various panels together presents a reasonably flush surface at the interior of the house, such that the animal is not tempted to play with the parts of the fasteners. Also, the animal is protected against injury resulting from inadvertent contact with such fastenings.

The above objects are accomplished by a one-piece cardboard house for an animal or pet, comprising a bottom panel constituting a floor, front and rear panels, and two side panels, each of the latter four panels being integral with the bottom panel, and forming the four walls of the house. A pair of roof panels is hingedly connected to form a peaked roof, and the panels are integral with one another and with one of the side walls of the house. The edge of one of the roof panels is integral with one side wall, and is joined to the opposite side wall by releasable fastening means. The front panel has a large notch at its top edge, which partially defines an entrance passage to the house, with other parts of the entrance passage being defined by the front edge portions of the two roof panels. The arrangement is such that the house can be readily assembled without the use of special tools, and without the need for cutting of parts, etc. Also, once assembled, the house can be dismantled and stored in an essentially flat condition, which makes the unit especially practical from the standpoint of the consumer. Due to the fact that no special adhesives, tapes, glues, or the like are involved with the assembly, there is eliminated the inconvenience and mess normally associated with the use of such substances. Because of the releasable nature of the fastenings between the various panels, no tearing or other destruction of the cardboard occurs in the event that the house is taken apart for storage, shipping, etc. This was not true of many of the devices of the prior art, which were subject to damage due to tearing of glued panels, or untaping of cardboard sections, etc.

The special arrangement of the entrance opening, involving a deep notch in the front panel, and the use of the edges of the two roof panels for defining a portion of the opening, permits the animal to be readily viewed by the owner, and vice-versa, thus adding a dimension of enjoyment to the use of the house. Also, the fabrication is simplified, since there are required no closed cut-outs for defining the entrance opening, as is the case in many of the devices illustrated in the prior art references.

Other features and advantages will hereinafter appear.

In the drawings, illustrating a preferred embodiment of the invention:

FIG. 1 is a perspective view of the improved one-piece cardboard pet house of the present invention, showing the various panels assembled to one another.

FIG. 2 is a front elevation of the house of FIG. 1.

FIG. 3 is a left side elevation of the house.

FIG. 4 is a right side elevation of the house.

FIG. 5 is a rear elevation of the house.

FIG. 6 is a bottom plan view of the house.

FIG. 7 is a top plan view of the cardboard stamping or blank from which the house of FIG. 1 is made, illustrating the various panels and fastenings that make up the same. Fold lines are indicated in dotted outline in this figure.

FIG. 8 is a fragmentary view of the inner surface of one of the side panels of the house, showing a fastening arrangement including a tab, wherein the tab has no exposed end inside.

Referring now to FIGS. 1-6, there is shown as provided by the invention, a one-piece cardboard house for an animal or pet, designated generally by the numeral 10 and comprising a bottom panel 12 constituting a floor of the house, front and rear panels 14, 16 respectively, and two side panels 18, 20, constituting the four upright walls. In addition, the house comprises a pair of articulated roof panels 22, 24 which are hingedly connected together to form a peaked roof for the structure.

In accordance with the present invention there is provided a novel entrance passage 26 for the house, which is formed partially by a cut-out configuration or deep notch 28 in the front panel 14, and partly by the edge portions 30, 32 of the roof panels 22 and 24 when the house is assembled. As shown in FIGS. 1, 2 and 7, the notch 28 in the front panel 14 can have the shape of a crescent, and the upper portion of the entrance passage 26 which is defined by the edge portions 30, 32 can have a roughly triangular shape. The entrance passage 26 is sufficiently large so that the owner can readily view the animal, if desired, and the pet can see the owner as well, thus enhancing the overall enjoyment of the pet house. The notch 28 can be formed in the front panel at the same time that the cardboard blank of FIG. 7 is formed, this being done preferably with a suitable punch and die. The use of the edge portions 30, 32 of the roof panels 22, 24 as part of the entrance passage 26 greatly simplifies the manufacture of the house, since no cutting or forming of the edge portions 30, 32 is required, and in addition the entrance passage is seen to have an unusual shape which has been found to be aesthetically pleasing to the eye.

By the present invention, the two roof panels 22 and 24 are integral with one another, and integral with the one side panel 20. The roof panel 24 has a free edge portion 34 which is held adjacent to the edge portion 36 of the left side panel 18.

In accomplishing the assembly or setting up of the house, the panel 24 is provided with a tab 38 having divergent ears 40, 42 at its free extremity portion, and the panel 18 has a pair of coextensive slots 44, 46 which receives the tab 38 when the roof panels are in place, as shown in the figures. The tab 38 is inserted into the slot 44, and then passed outwardly through the slot 46 such that the ears 40, 42 are exposed only at the exterior of the house. This is considered to be an important feature of the invention, since at the interior of the house there exist no protrusions or exposed ends of the tab which might otherwise tempt the animal to play with them or to chew on them, such activity possibly leading to damage to the house, or injury to the pet.

The tab ears 40, 42 are arranged and so located that their ends extend past the ends of the slots 44, 46, thus normally preventing inadvertent removal of the tab. During installation of the tab 38 into the slots 44, 46, the ears 40, 42 can be bent slightly inward, or even folded inwardly, to facilitate the insertion. The above arrangement thus provides a substantially flat surface at the interior of the house, which is considered to be important for the reasons indicated above. FIG. 8 shows the tab 38 and slots 44, 46 as they would appear, from inside the house.

Referring again to FIGS. 1-5 and 7, each of the front, rear and side panels has two opposite vertical edge portions which are intended to be juxtaposed to corresponding edge portions of an adjacent panel. The front panel has edge portions 50, 52, and the rear panel has edge portions 54, 56. The side panels 18 and 20 have edge portions 58, 60, and 61, 62 respectively.

In accomplishing the fastening of the front and rear panels to the side panels, the front panel 14 has tabs at its opposite edge portions, indicated by the numerals 63 and 64. The tab 63 is intended to be folded rearwardly and inserted in the elongate, vertically disposed, coextensive slots 65, 67 of the side panel 18, in the same manner as described above in connection with the tab 38. Similarly, the tab 64 is folded back and inserted into the slots 66, 68. The rear panel has tabs 70, 72 which are folded in a forward direction and inserted into slots 74, 76, and 78, 80 respectively. In some of the appended claims, the tabs 63, 64, 70 and 72 are referred to as locking tabs, and other tabs 86, 88 are referred to as retainer tabs.

By the present invention, the rear edge portions 84, 82 of the two hinged roof panels 22 and 24 have tabs 86, 88, which are intended to be folded downwardly and inserted into corresponding slots 90, 92 and 94, 96 respectively of the rear panel 16. As in the case of the previously described tabs, the tabs 86 and 88 have opposite ears which are intended to prevent inadvertent release of the tabs after the house is fully assembled. The panels 22 and 16 are seen to form an adjacent joined pair, as do the panels 24 and 16.

The panels of the house can be provided with various kinds of decorative markings, if desired, such as windows, doors, or shutters; or with names of the pet, etc., in order to enhance its appearance. Also, the roof can have painted shingles, or other markings to give the desired visual impressions.

With respect to the material from which the house is fabricated, we have found that corrugated C-flute board having a 200 pound breaking strength is admirably suited for the present purposes.

The pet house as above described has the following advantages. First, the unit is constructed from a single piece of cardboard, and accordingly and manufacturing cost can be kept to an absolute minimum. The cardboard blanks can be stamped out in the pattern shown in FIG. 7, and thereafter the blank decorated or painted, if desired.

Second, the entrance passage 26 is sufficiently large to permit viewing of the animal by the owner, and vice-versa. This feature adds to the overall enjoyment of the house, since there are no feelings of isolation on the part of either party.

Third, no complex die shapes are required in forming the entrance passage. This is important from the manufacturing or cost standpoint.

Fourth, since no glues or adhesives are required in the assembly, the house can be readily disassembled, if desired, as would be required during shipping of the same, or for storage. It has been found that the arrangement of the tabs and slots provides a highly satisfactory solution to the problem of adequately releasably fastening the panels together without damaging them, and in such a manner that the assemblage can be readily broken down or dismantled.

In addition, the house presents a generally smooth interior surface which is devoid of protrusions or sharp edges, thus minimizing the possibility of injury to the pet, or of damage to the house.

For shipping, the front and rear panels 14 and 16, and side panel 18 can be folded over, on the dotted lines 102, 104 and 100 respectively, and superimposed on the bottom panel 12. Then the panels 22 and 24 can be folded as a unit from their flat condition, over the panels 12 and 20, along dotted line 106, and the resulting assemblage tied with string or otherwise secured, to form a flat package. Through actual tests, we have found that such a flat package can be safely shipped over extended distances, without damage occuring to the structure. Such a feature is important where the device is intended to be sold through mail order, etc.

Finally, the use of cardboard enables the house to be economically fabricated, so as to keep the overall costs as low as possible. In the event that the house became inadvertently damaged or in need of cleaning, it is always possible to merely discard the old unit and purchase a new one, without incurring high replacement expense.

From the above it can be seen that we have provided a novel and improved house for pets, the construction being especially simple and straightforward, so as to be readily assembled without the use of special tools, fasteners, etc.

The device is thus seen to represent a distinct advance and improvement in this field.

Each and every one of the appended claims defines a distinct aspect of the invention, different from all others, and accordingly each claim is to be treated in this manner when examined in the light of the prior art, in any determination of novelty or validity.

Variations and modifications are possible without departing from the spirit of the claims.

What is claimed is:

1. A one-piece cardboard house for an animal or pet, comprising in combination:
   (a) a bottom panel constituting a floor,
   (b) front and rear panels, and two side panels, each of said panels having two substantially vertical edge portions and being integral with the bottom panel, thereby being adapted to form the four walls of the house,
   (c) a pair of roof panels having free edge portions, said roof panels being integral with each other and with one of the side panels of the house, and being hingedly connected with each other and adapted to form a peaked roof,
   (d) means releasably joining one free edge portion of one roof panel to the other of said side panels,
   (e) means releasably holding the vertical edge portions of the front and rear panels adjacent to corresponding edge portions of the side panels of the house, and
   (f) means providing an entrance passage at the front of the house, said entrance passage being defined by edge portions of the front panel and by adjacent front edge portions of the said roof panels,
   (g) said front panel having a deep and wide notch in its top edge portion, outlining the bottom of said entrance passage.

2. The invention as defined in claim 1, wherein:
   (a) said notch of the front panel is of generally crescent shape.

3. The invention as defined in claim 1, wherein:
   (a) the upper part of the entrance passage, comprising the front edge portions of the roof panels, is of generally triangular shape.

4. The invention as defined in claim 1, wherein:
   (a) each of said side panels has a pair of slots,
   (b) said front panel having a pair of integral tabs extending rearwardly into said pairs of slots, respectively, said slots and tabs constituting the means releasably holding the vertical edge portions of the front and side panels adjacent to each other.

5. The invention as defined in claim 4, wherein:
   (a) each of the slots of said pairs is elongate vertically, and the slots of each pair are coextensive with one another.

6. The invention as defined in claim 1, wherein:
   (a) each of said side panels has a pair of slots,
   (b) said rear panel having a pair of integral tabs extending forwardly into said pairs of slots, respectively, said slots and tabs constituting the means releasably holding the vertical edge portions of the rear and side panels adjacent to each other.

7. The invention as defined in claim 6, wherein:
(a) each of the slots of said pairs is elongate vertically, and the slots of each pair are coextensive with one another.

8. The invention as defined in claim 1, wherein:
(a) one of said pair of roof panels and said rear panel form an adjacent joined pair;
(b) one of said joined pair of panels having a locking tab along one edge,
(c) the other of said joined pair of panels having a pair of slots disposed adjacent in said one of the joined pair panel,
(d) said locking tab passing through both of said slots, so as to releasably hold the joined pair of panels in juxtaposition.

9. The invention as defined in claim 1, wherein:
(a) each of said side panels has a slot,
(b) said front panel having a pair of integral tabs extending rearwardly into said slots, respectively, said slots and tabs constituting the means releasably holding the vertical edge portions of the front and side panels adjacent to each other.

10. The invention as defined in claim 1, wherein:
(a) each of said side panels has a slot,
(b) said rear panel having a pair of integral tabs extending forwardly into said slots, respectively, said slots and tabs constituting the means releasably holding the vertical edge portions of the rear and side panels adjacent to each other.

* * * * *